US008891221B2

(12) United States Patent
Onodi

(10) Patent No.: US 8,891,221 B2
(45) Date of Patent: Nov. 18, 2014

(54) ELECTRICAL INSTALLATION, INSTALLATION KIT, AND BRANCH OFF DEVICE

(75) Inventor: Tamas Onodi, Thalwil (CH)

(73) Assignee: Woertz AG, Muttenz (CH)

( * ) Notice: Subject to any disclaimer, the term of this patent is extended or adjusted under 35 U.S.C. 154(b) by 72 days.

(21) Appl. No.: 13/603,515

(22) Filed: Sep. 5, 2012

(65) Prior Publication Data

US 2013/0235501 A1 Sep. 12, 2013

(30) Foreign Application Priority Data

Sep. 7, 2011 (EP) .................................. 11007285

(51) Int. Cl.
*H02H 5/04* (2006.01)
*H02J 4/00* (2006.01)
*H01R 13/713* (2006.01)
*H01R 12/67* (2011.01)

(52) U.S. Cl.
CPC . *H02J 4/00* (2013.01); *H01R 12/67* (2013.01); *H01R 13/7137* (2013.01)
USPC .......................................... 361/103; 361/105

(58) Field of Classification Search
CPC .. H01R 13/7137; H01R 12/67; H01R 13/527; H01H 37/00; H01H 37/76
USPC ................................. 361/103, 105
See application file for complete search history.

(56) References Cited

U.S. PATENT DOCUMENTS 4,636,766 A * 1/1987 Carbone et al. ............... 337/368
5,831,507 A * 11/1998 Kasamatsu et al. ............ 337/4
6,027,367 A 2/2000 Woertz et al.
6,140,905 A 10/2000 Shoji
6,204,747 B1 3/2001 Kitchens
6,551,124 B1 * 4/2003 Gossmann .................... 439/411
2002/0127917 A1 9/2002 Chang
2007/0006603 A1 1/2007 Reusche et al.

FOREIGN PATENT DOCUMENTS

| DE | 10 2007 029047 | | 12/2008 |
| EP | 0665608 | | 8/1995 |
| GB | 2419240 A | * | 4/2006 |
| WO | WO 2011/091738 | | 8/2011 |

OTHER PUBLICATIONS

European Search Report dated Feb. 21, 2012 for Application No. 11007285.7.
English Abstract and Machine Translation of German Application No. DE 10 2007 029047.
English Abstract and Machine Translation of European Application No. EP 0665608.
European Search Report dated Jan. 2, 2014 for Application No. EP 11007285.7.

* cited by examiner

*Primary Examiner* — Scott Bauer
(74) *Attorney, Agent, or Firm* — Frost Brown Todd LLC

(57) ABSTRACT

An electrical installation with circuit integrity of an electric through line under fire impact. Branch off devices are connected to the through line, and branch lines are connected to the branch off devices. The branch off devices include a thermally triggering disconnect device for providing circuit integrity of the through line under fire impact. The disconnect device is configured to disconnect an electrical connection between the branch line and the through line self-acting when an ambient temperature increases to a predetermined value that is typical for a fire. An installation kit and a branch off device for such an electrical installation.

16 Claims, 1 Drawing Sheet

ELECTRICAL INSTALLATION, INSTALLATION KIT, AND BRANCH OFF DEVICE

FIELD OF THE INVENTION

The invention relates to an electrical installation, an installation kit, and a branch off device.

SUMMARY OF THE INVENTION

One aspect relates to an electrical installation with circuit integrity of an electric through line under fire impact. The installation comprises the through line, plural branch lines, and plural branch off devices. The branch off devices are connected to the through line. The branch lines are connected to the branch off devices. The branch off devices comprise a thermally triggering disconnect device for providing circuit integrity of the through line under fire impact. The disconnect device is configured to disconnect an electrical connection between the branch line and the through line self-acting when an ambient temperature increases to a predetermined value that is typical for a fire.

Another aspect relates to an installation kit for an electrical installation with circuit integrity of an electric through line under fire impact. The kit comprises at least one through line, at least one branch line, and at least one branch off device. The branch off device comprises a thermally triggering disconnect device for providing circuit integrity of the through line under fire impact. The disconnect device is configured to disconnect an electrical connection between the branch line and the through line self-acting when an ambient temperature increases to a predetermined value that is typical for a fire.

Another aspect relates to a branch off device for electrically connecting an electric branch line with an electric through line. The branch off device comprises a thermally triggering disconnect device for providing circuit integrity of the through line under fire impact. The disconnect device is configured to disconnect an electrical connection between the branch line and the through line self-acting when an ambient temperature increases to a predetermined value that is typical for a fire.

BRIEF DESCRIPTION OF THE DRAWINGS

The appended drawing figures schematically illustrate examples, wherein.

The drawings and the description of the drawings are of examples of the invention and not of the invention itself.

DETAILED DESCRIPTION OF EXAMPLES

Figure 1:
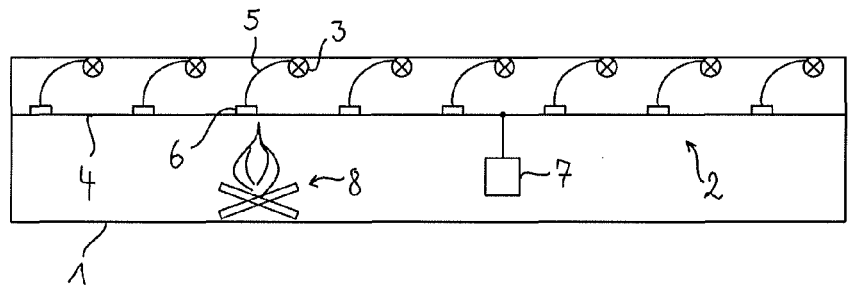
FIG. 1 illustrates an electrical installation in a tunnel with an electric through line and with electric branch lines connected thereto through branch off devices for supplying consumers, such as lights with electrical energy.

In a tunnel 1 of which an exemplary section is illustrated in FIG. 1, an electrical installation 2 for illuminating the tunnel 1 is installed. Thus, the installation 2 includes consumers, e.g. lights 3 which are attached to a ceiling of the tunnel 1. The tunnel in this example has an overall length of approximately 5 km, wherein a light 3 is respectively arranged at a distance of 20 m, so that the installation includes a total of 250 lights 3. It is appreciated that the lights 3 and the remaining figures are only symbolic depictions and are not drawn to scale.

A through line 4 is used for supplying the lights 3 with electrical power in the installation 2, wherein the through line 4 essentially extends over the entire length of the tunnel 1. At this through line 4, each light 3 is connected through a separate branch line 5 and thus respectively through a separate branch off device 6, through which the through line is tapped without stripping the insulation. Thus, in this example, the number of lights 3 also corresponds to the number of branch off lines 5 and to the number of branch off devices 6. Alternatively, two respective lights are connected to a branch off device respectively through a particular branch line, thus two separate branch lines.

Overall, the electrical installation is installed with elements of an installation kit which includes the through line 4, the branch off devices 6, the branch lines 5 and consumers, such as the lights 3, plus associated mounting material. In alternative examples the installation kit only includes the through line 4, the branch off devices 6, and the branch lines 5.

In order to supply energy, the through line 4 is fed by a single electrical power source 7 which is connected e.g. between two branch off devices 6. Instead, the power source 7 can also be connected at one end of the through line 4. Furthermore, a voltage drop along the through line 4 can be alternatively compensated with plural power sources 7 which are connected along the through line 4. In order to assure that the through line 4 is most reliably supplied with power under fire impact, the power source 7 is not connected through a branch line 5 and a branch off device 6 as will be described infra, but through a fire safety cable.

Overall, the installation 2 is configured through plural exemplary measures for circuit integrity under fire impact as will be described infra.

According to a first exemplary measure, the through line 4 is configured from a fire safety cable with circuit integrity under fire impact, wherein the fire safety cable, in one example, may be a flat cable with strands which provides, for example, at least 90 minutes of circuit integrity duration under fire impact. This circuit integrity under fire impact is thus facilitated on the one hand side through arranging the strands of the flat cable that extend parallel adjacent to one another in a plane, so that also when melting off or burning off the insulation, the strands are not moved towards one another through a force, like e.g. for twisted strands, and shortened. On the other hand side, the flat cable may be provided with a particularly fire resistant insulation which keeps the strands at a distance from one another also under fire impact. Thus the through line 4 can be under fire impact for a long time and still maintain electrical current conduction without short circuit. Thus it is furthermore assured that the through line 4 transports electrical power to supply consumers under fire impact also beyond the fire impact area 8 and in particular that the through line 4 does not become unsuitable for power conduction due to a short circuit in the fire impact area 8.

Under fire impact, the fire impact area typically only extends over a particular partial length of the tunnel 1. FIG. 1 illustrates a fire impact area 8 that is limited in an exemplary manner along the tunnel 1, wherein only one of the lights 3 are impacted by detrimental fire and heat. Herein, the fire impact area 8 is an area of the tunnel in which temperatures of at least 150° C. prevail under fire impact. This particular fire typical temperature was selected herein since starting with the slightly higher temperature of 180° C., a damaging of the lamps 3 and of the branch line 5 occurs which is due to their configuration and which can lead to a short circuit. Thus, the branch line 5 and/or the consumers (lights) 3 have a lower circuit integrity duration than the through line 4.

For lights and/or branch lines that are configured differently with different temperature resistance, the fire impact area 8 can be defined by other temperatures. Furthermore, this temperature must not be mixed up with the test temperatures which are defined e.g. through pertinent standards for determining circuit integrity duration.

Though the through line 4 is configured as a fire safety cable, there is the basic risk that, as recited supra, the light 3 disposed in the fire impact area 8 or its branch line 5 are shorted for example due to insulations melting off or burning off. This short circuit could, without a disconnect device 9 described below, short the through line 4 through the branch off device 6 and could thus lead to a total failure of the electrical installation 2, thus of the entire lighting in the tunnel 1.

Figure 2:
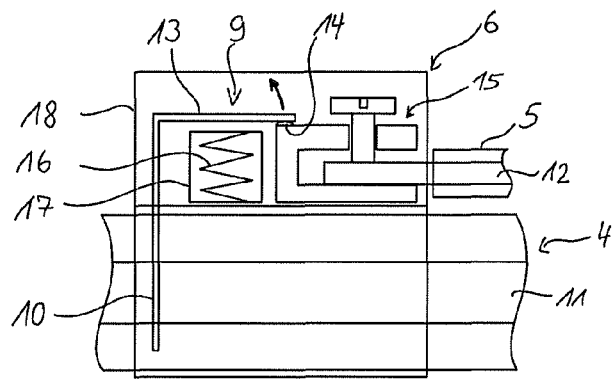
FIG. 2 illustrates a branch off device with a first example of a disconnect device.

On the other hand side, as an additional measure, the branch off device 6 is configured with a thermally triggering disconnect device 9 which is described in more detail in FIG. 2. The disconnect device 9 is thus configured for self-acting disconnection of the electrical connection between the branch line 5 and the through line 4 when the ambient temperature of the branch off device 6 increases to the predetermined fire typical value of 150° C. (disconnect temperature). Thus, the light 3 and the branch line 5 are electrically disconnected from the through line 4 essentially at a disconnect temperature of 150° C., thus before a fire induced short circuit in the light 3 and the branch line 5 can occur starting at approximately 180° C.

For this purpose, the branch line 5 may be selected as short as possible, namely in this example at approximately 4 m since the branch off device 6 (the thermally triggered disconnect device 9) should essentially be exposed to the same temperature as the branch line 5 and the lamp 3. This assures that the disconnect device 9 does not trigger unnecessarily because the branch off device 6 is exposed to higher temperatures than the branch line 5 or the light 3 since only the branch line 5 or the light 3 are exposed to high damaging temperatures while the branch off device 6 is positioned at a location that is cooler and too far away. Therefore, as a function of the configuration of the tunnel, the branch off device 6 may be arranged with reference to the lights 3 and the course of the branch line 5 in a spatial manner so that fire impact causes substantially identical temperatures at the location of these installation components, thus branch off device 6, branch line 5 and light 3.

The example of the branch off device 6 schematically illustrated in FIG. 2 illustrates the branch off device installed on the through line 4 in normal (non-triggered) operating condition. Thus, in normal operating condition, the electrical connection between the through line 4 and the branch line 5, thus also the light 3, is established. In this example, the through line 4 and also the branch line 5 are configured with one phase, thus configured with three strand conductors, namely a phase conductor, a zero conductor and a protective conductor.

Thus the branch off device 6 is respectively configured with a separate disconnect device for the outbound conductor and the return conductor, namely for the phase conductor and the zero conductor. In FIG. 2, however, in an exemplary manner, only the branch off for the phase conductor 11 is illustrated, wherein the branch off for the zero conductor is configured analogously thereto, however, arranged offset by the conductor pitch of the flat cable transversal to the longitudinal direction of the through line. In the longitudinal direction the branch-offs for the different conductors may be aligned, or alternatively offset relative to one another. Furthermore, suitable fire resistant insulating elements are arranged between the subsequently described electrical components of the branch off device 6 for the zero conductor and the phase conductor 11, wherein the fire resistant insulating elements prevent a short circuit also when the insulation of the through line 4 burns off in the portion of the branch off device 6 (in particular up to the disconnect device 9).

Alternatively, the through line is for example configured with three phases. Thus, one phase and also two or three phase branch lines can be connected to the through line. Thus, for example branch off devices are provided which facilitate simultaneous tapping of all outbound and return conductors, thus of all three phase conductors and the neutral conductor. Furthermore, additional branch off devices are provided which are configured for respectively tapping a single particular phase conductor, so that various branch off devices configured for the respective phases are mounted at the through line for respectively tapping particular different phases.

Overall, as subsequently described in detail, in some examples the electrical connection between the pass through line 4 and the branch line 5 (more precisely respectively between one strand conductor 11 of the through line 4 and a respective strand conductor 12 of the branch line 5) are established through a tapping device for tapping the through line 4, the disconnect device 9 and eventually a connection device for connecting the branch line 5.

In the illustrated branch off device 6, essentially a contact blade for penetrating the through line 4 is provided as tapping device. Therein, the contact blade 10 contacts the strand conductor 11 (phase) of a high voltage strand of the through line 4, thus without stripping the flat cable. In order for the contact blade 10 not to be pulled out unintentionally and/or the branch off device not disengaging unintentionally from the through line 4, the housing 18 of the branch off device 6 reaches around the flat cable of the through line 4. Thus, the housing 18 is furthermore used as a counter bearing when the contact blade 10 is stuck into the through line 4. Thus, the through line 4 is run through the branch off device 6.

Figure 3:
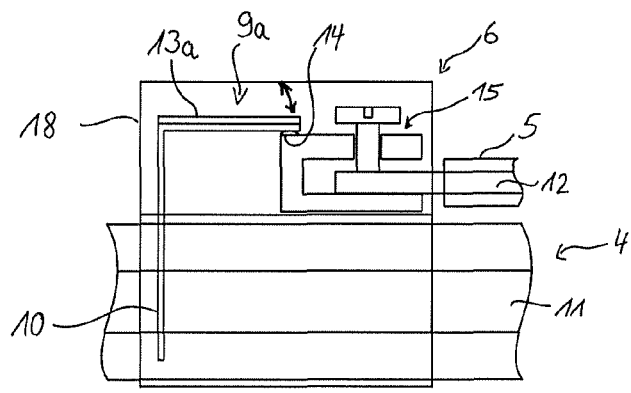
FIG. 3 illustrates a branch off device with another example of the disconnect device.
Figure 4:
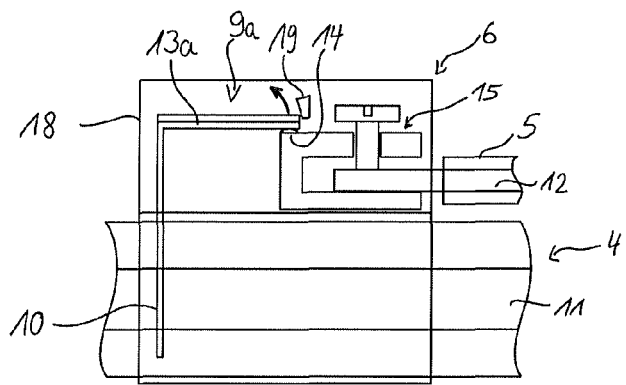
FIG. 4 illustrates a branch off device with another example of the disconnect device.

The contact blade 10 illustrated in FIGS. 2 through 4 is configured mandrel shaped and positioned for central penetration into the strand conductor 11 within the branch off device 6. In other examples, the contact blade is fork shaped with two prongs between which the strand conductor 11 can be clamped and can thus be safely contacted even when the insulation of the flat cable burns off. Optionally, the prongs are configured with engagement lugs or barbed hooks in order to safely support the strand conductor 11 between the prongs. In the other examples, a contact screw with a thread is provided for centrally turning it into the strand conductor 11. In other examples, two contact screws are provided that are offset transversal to the longitudinal direction of the through line 4, wherein the strand conductor 11 can be clamped between the contact screws. In some of these examples, the contact screws are additionally arranged offset in longitudinal direction so that the strand conductor 11 is deformed in S-shape when both contact screws are screwed in, so that a greater contact surface is provided between the contact screws and the strand conductor 11.

According to FIG. 2, the contact blade 10 is integrally configured with one contact arm 13 of the disconnect device 9. Alternatively, the tapping device is a single component or assembled from plural components and eventually electrically connected with the disconnect device 9 and mounted in the branch off device 6.

The disconnect device 9 essentially includes the contact arm 13 and a compression spring 16 which is cast into a plastic cylinder 17 and thus supported in loaded condition.

The contact arm 13 is configured elastic against bending and contacts a contact point 14 of the disconnect device 9 in normal operating condition. In this condition, the disconnect device 9 is not triggered and the electrical connection is established.

Thus the electrical connection can be disconnected by bending the contact arm 13, wherein the contact arm as illustrated by the arrow in FIG. 2, pivots away from the contact point 14. Alternatively, the contact arm is not configured bending elastic and instead pivotably linked in its entirety.

For bending the contact arm 13, the compression spring 16 is provided. When the plastic cylinder 17 heats up under fire impact, it melts when its melt temperature is reached which is selected so that it corresponds to the desired disconnect temperature of 150° C. When the plastic cylinder 17 melts, it releases the compression spring 16. Thus, the compression spring 16 can freely impart its spring force, wherein it is arranged between the housing 18 and the contact arm 13. Thus, the spring force is sized sufficiently to bend the contact arm 13 at least far enough (in FIG. 2 upward along the arrow), so that it pivots away from the contact point 14 and the electrical connection is interrupted. Consequently, when reaching the separation temperature of 150° C., the electrical connection is automatically disconnected by this mechanism.

Thus, in this example the disconnect device is configured to perform disconnection by a disconnector movement and to store energy convertible into disconnector movement. The disconnect device releases the stored energy and performs the disconnector movement using the stored energy when the ambient temperature increases to or past the predetermined value that is typical for a fire.

Furthermore, the disconnect device 9 thus configured is a non-self-resetting (irreversible) thermal safety, since also when the ambient temperature sinks below the separation temperature, only the previously melted plastic material of the plastic cylinder 17 re-solidifies, but the spring force and the bending of the contact arm 13 does not taper off so that the electrical connection remains permanently disconnected. It is furthermore appreciated that the once triggered disconnect device 9 can be manually reset in that the expanded compression spring 16 is removed and a new plastic cylinder 17 together with an included preloaded compression spring 16 is used. Besides that, the plastic cylinder 17 can be solid or it can also only be formed as a cylindrical vessel for the compression spring 16. Alternatively, additional non-cylindrical shapes like e.g. cuboids are suitable to receive the compression spring 16. In other examples the plastic cylinder 17 with its included compression spring 16 is not inserted as single loose component into the branch off device 6, but the compression spring 16 is directly cast into the branch off device 6. In other examples, a tension spring is provided instead of a compression spring. In other examples, the tension- or compression spring is not arranged within the plastic element in loaded condition, but supported at one of its ends in loaded condition by a respectively shaped plastic element, for example in that the plastic element is configured with a hook or a groove for support or in that the plastic element is arranged as a stop for the loaded spring. Furthermore, in other examples, instead of a plastic element, an element made from different materials melting at the disconnect temperature, for example wax or an alloy is used.

The connection device for connecting the branch line 5 essentially includes a screw clamp 15 in which the strand conductor 12 of the branch line 5 is insertable and fixable with a screw. According to FIG. 2, the contact point 14 of the disconnect device is configured integrally in one piece with the screw clamp 15 of the connecting device. In alternative examples, the disconnect device 9 is implemented physically separate from the connecting device, however, connected in an electrically conductive manner with the connecting device in a mounted condition of the branch off device 6.

The subsequently described examples only differ with respect to the disconnect device 9.

FIG. 3 illustrates an alternative disconnect device 9a in which the contact arm 13a is a bi-metal which bends away starting at the disconnect temperature of 150° C. from the contact point 14 according to the arrow in FIG. 3 in upward direction. Instead of being pivoted through the spring force of an additional spring as recited supra, the contact arm 13a is pivoted away from the contact point through its self-acting temperature controlled bending movement. Thus, this disconnect device is configured to perform disconnection by a disconnector movement powered by thermal energy from an ambient temperature increased to or past the predetermined value that is typical for a fire.

In this example, this movement is reversible based on the bi-metal besides an insignificant hysteresis and the contact arm 13a moves back to the contact point 14 when the ambient temperature decreases. The mechanism of this example reestablishes the electrical connection after a preceding disconnect (triggering) self-acting when a subsequent cooling below the disconnect temperature occurs. Thus, this example represents a self-resetting thermally triggered safety.

As illustrated in the other example according to FIG. 4, the self-resetting property can be prevented for example in that the contact arm 13 is locked in triggered condition by an engagement lug 19. Thus, the contact arm in spite of the ambient temperature cooling to any value below the disconnect temperature cannot return in its starting position and cannot establish a contact with the contact point 14. Thus, this example illustrates a non-self-resetting thermally triggered safety based on the bi-metal spring element 13a.

Furthermore, in the examples recited supra, the branch off device 6 is not configured with a conventional over current safety so that the separation of the electrical connection is only provided as a function of ambient temperature and independently from the current through the branch line 5.

However, a short circuit can also occur at non-fire-typical temperatures, for example for a short time period at an end of a service life of the lights 3, so that in some examples the lights are respectively configured with an over current safety (in addition to the thermally triggering safety through the branch off device 6) for protecting the through line 4.

Furthermore, also the through line 4 can be secured against over current. In an alternative example, the through line 4 is divided into plural sections, wherein each section is secured through a separate over current safety. Therefore the respective lights 3 which are connected at a common section are also jointly over current secured. Thus, when a short circuit occurs in the light 3, only the over current safety of the associated section triggers and interrupts current conduction in this section. Therefore, only the lights 3 connected to this section are concerned, whereas all other lights 3 of the installation 2 remain unimpaired. In another example, two such electrical sections extend spatially parallel to one another, wherein the lights 3 are respectively connected along the tunnel 1 at one or another electrical section of the through line. When a section fails due to triggering of an over current safety, only every second light 3 fails along the tunnel so that basic lighting in the respective tunnel section is still provided.

Some more general points of examples will be discussed:

A plurality of distributed electrical consumer devices (or "consumers") like e.g. lights along a tunnel can be electrically installed in that electric branch lines are installed from a common electric through line to individual consumers. Thus, the through line is used for jointly supplying all consumers, wherein for example two consumers that are offset from one another are connected through separate branch lines with the through line.

In case of a fire in a portion of an electrical installation of this type, at least the consumers which are outside of the area of the fire shall not be functionally impaired and thus shall also not be impaired when one or plural consumers and their associated branch lines are damaged by the fire.

The suitability of the electrical installation for supplying power also under the impact of a fire is generally designated as circuit integrity. The circuit integrity is defined by various standards.

For example, cables are loaded with a voltage according to the standard IEC 60331-11/-21/-23/-25 and are subjected to a temperature greater than 750° C. under flame impact for 90 to 180 minutes. After some time, the strand insulations of the cable lose their insulation capability due to flame impact and there is a short circuit between the cable strands. This means loss of circuit integrity. Thus, the loss of circuit integrity is caused by the loss of insulation. Accordingly, the circuit integrity of a cable is substantially determined by the insulation integrity of the cable. The behavior under this test is specified by the duration of insulation integrity in minutes. Similar standards are BS 6387 cat. C and VDE 0472-814.

Other standards relate to functional integrity of cables under the impact of fire and water (which for example shall represent the effect of sprinkler systems in case of a fire), thus e.g. DS 6387 cat. W and VdS 3423. Other standards relate to circuit integrity of cables under fire and mechanical impacts which for example shall represent the effect of parts falling onto the cable as it often occurs during a fire, thus EN 50200, EN 50362, and ES 6387 cat. Z.

Besides that there are standards which relate to circuit integrity not only of cables, but of entire installation systems. This is designated as "system circuit integrity." For system circuit integrity, support elements like cable attachments, cable suspensions and cable supports, and electrical connection elements like branch off and connection devices are integrated in addition to the cable since they all together provide circuit integrity of an entire installation. A standard relating to system circuit integrity is for example DIN 4102 part 12. In a test according to this standard, the entire installation is exposed to a flame and thus heated over a length of three meters according to a particular increasing standard temperature curve which initially increases in a rather steep manner and then becomes flatter and flatter until it reaches approximately 900° C. after 90 minutes. The behavior under this test is represented by "E" with a designation of the duration of the circuit integrity in minutes. Thus, "E 90" means system circuit integrity over 90 minutes.

Usual cables or also consumers do not comply with such circuit integrity requirements since their insulators quickly melt or burn off under fire impact and a short circuit is then generated when the conductors touch. Therefore, particular equipment is required to prevent a short circuit, for example special insulations and/or mechanical support of power carrying components. In general, obtaining higher circuit integrity durations is technically demanding. The same applies with respect to the relatively high requirements which are placed upon the support elements and connecting elements by the system circuit integrity standards.

In conventional installations, lines branching off from a through line (branch lines) are directly connected to the through line. For example, respective strands of the through line are directly connected with respective strands of a branch line. When a short circuit occurs in a branch line under the impact of fire or in a consumer connected to the branch line because an electrical insulation has burned off or has melted away, this fault impacts the entire through line. In this case, also additional consumers, or worst case electrical installations will fail that are not exposed to the fire since also the through line is shortened through the short circuit of the branch line or the consumer.

The branch off device described herein secures the through line against this from happening in that a branch line that is arranged in the area of the fire is automatically disconnected from the through line. Thus, a short circuit which occurs with reference to the through line "behind" the branch off device (thus in the branch line itself or in a consumer connected thereto) does not lead to shorting the through line. For this purpose, the disconnect device is configured for automatic disconnecting of the electrical connection between the branch connector and the through connector when the ambient temperature increases to a predetermined value that is typical for fire (so-called disconnect temperature).

Typical for fire means that the ambient temperature only reaches such value during a fire or that it also exceeds the value and it also means that the disconnect temperature is above the temperatures which can occur during operations without fire. In this sense, the "fire area" designates a spatial portion of the electrical installation where fire typical temperatures occur in case of a fire, in particular at least the disconnect temperature is reached. In some examples of the branch off device, the fire typical value, thus the disconnect temperature, is for example 70° C., 80° C., 100° C., 120° C., 150° C., 180° C., 250° C., or even higher temperatures. In some examples, also lower disconnect temperatures are provided, for example in case a fire shall be detected particularly quickly and/or when the ambient temperatures occurring during operations typically do not undercut a respective lower value, thus in tunnels or for cool climate conditions.

Furthermore, the branch off device is configured so that before triggering the disconnect device, the electrical connection between the branch line and the through line is switched through.

Subsequently, the portion that is in an electrical sense behind the disconnect device viewed from the through line which substantially includes the branch line, consumers connected thereto and a connection device of the branch off device for connecting the branch line is abbreviated as "branch" for better readability.

With respect to circuit integrity under fire impact, lesser requirements are placed on the branch due to the branch off device, since its loss of circuit integrity (e.g. short circuit) due to the thermally induced disconnect cannot lead to loss of circuit integrity of the through line. Accordingly, the branch off device facilitates using less expensive and simpler branch lines and consumers which have a time-reduced circuit integrity duration relative to the through line in case of a fire.

In some examples the electrical installation comprises plural consumer devices connected to the branch lines, and the branch lines and/or the consumer devices have a lower circuit integrity duration than the through line, the through conductor and the branch off device.

Some examples are configured to be exposed to fire-typical temperatures, e.g. 300° C., 500° C., 700° C. or 900° C., for a certain period of time, e.g. 30, 60, 90, 120 or 180 minutes, without causing a short cut of the through conductor. Though the through conductor and the branch off devices comply with such circuit integrity, in these examples the branch conductors and/or the consumer devices connected to it do comply with less circuit integrity requirements since, for example, their insulators melt or burn off under these conditions within a shorter time interval, e.g. within less than 30 minutes at 300° C. Thus, at these conditions, e.g. under fire impact, a short circuit might be generated in the branch conductors and/or the consumer devices as their conductors might touch, but not in the through conductor and the branch off device.

Thus, overall, the disconnect device is a thermally triggered safety since it is configured to trigger at a particular ambient temperature, namely the disconnect temperature. It differs from the usual over voltage safety, for example in that it essentially operates independently from current.

Some examples of the disconnect device are configured to perform disconnection by a disconnector movement, wherein the disconnector movement is powered by thermal energy from an ambient temperature increased to or past the predetermined value that is typical for a fire. In these examples, the mechanical motion for disconnecting is driven by the thermal energy. Thus the disconnect device can work autonomously since it does not need any external energy source or power supplied by the through conductor. An example of a thermally driven disconnect device is a bi-metal switch which is normally closed but opens when the ambient temperature increases to or past the predetermined value.

In other examples the disconnect device is configured to perform disconnection by a disconnector movement and to store energy convertible into disconnector movement, and wherein the disconnect device is configured to release the stored energy and perform the disconnector movement using the stored energy when the ambient temperature increases to or past the predetermined value that is typical for a fire. The stored energy, for example, may be stored elastic energy, such as the mechanical energy stored in a deformed spring. The mechanical motion for disconnecting the electrical connection between the branch conductor and the through conductor is driven by the pre-stored mechanical energy, where the thermal energy obtained from the ambient temperature only initiates the release of the pre-stored energy and the motion for disconnecting.

In some examples, including the two classes of examples mentioned above, the disconnect device is configured to disconnect the electrical connection between the branch conductor and the through conductor by a mechanical motion driven by mechanical components only. For example, the disconnect device is only based on mechanical components for disconnecting the branch conductor and the through conductor and does not involve any electronic or electrically driven components.

Electrical disconnect devices that trigger at a particular temperature are known. For example, the so-called thermal links sold under the "Elmwood" brand irreversibly disconnect a connection between their two terminals when they are heated beyond a particular temperature. Thermal disconnect devices of this type are available for different disconnect temperatures and also for different current- and voltage classes. Typically they are used to protect heat sensitive components of a circuit against destruction, wherein the circuit heats itself up under high current.

Through a branch off device according to the examples, the branch is also switched without current in case of fire when the current conducting strands are connected by the disconnect device so that they are disconnectable when no short circuit is caused through the fire in the branch yet. This is helpful, for example for fire extinguishing work or for branch lines or consumers that have fallen down under an impact of fire in case their insulation is damaged by the fire, so that there is an electrical risk when they are touched.

Furthermore, the through line can also be protected through an over current safety against a short circuit in the branch. However, there is often a short term short circuit when an illuminant fails at an end of its service life. In case there is an additional over current safety in the branch off device, it is not sufficient to replace the illuminant, but rather the over current safety also has to be replaced when the over current safety is irreversible. Furthermore, over current safeties are provided with a certain inertia, so that an impairment of additional consumers along the pass-through line can still occur for a short circuit. Therefore, for some examples, the branch off device is not secured against over current, thus not configured with an over current safety.

This function where the branch lacks over current safety, however, is optional. Alternatively also the branch off device can be configured with an over current safety in addition to the thermal safety through the disconnect device.

As recited supra, after a fire (more precisely after a decline of the ambient temperature to any value below the disconnect temperature) a touching risk can be caused by damaged branch lines or consumers in case they are electrically reconnected again with the through line. In order to prevent this, an example of the branch off device is configured so that the disconnect device keeps the electrical connection disconnected also after a thermally triggered disconnect even when the ambient temperature drops to any value below the disconnect temperature. Thus, the connection between the branch line and the through line can be irreversibly disconnected, wherein the disconnect device is in particular a non-self-resetting thermally triggered safety.

For an irreversible disconnect device, for example an existing component, a so-called "thermal link" sold under the "Elmwood" brand can be used.

There are several options to prevent that a connection that has been disconnected once is reestablished self-acting.

For example, in some examples, the disconnect device includes a spring element for mechanically separating the electrical connection, wherein the spring element is supported in a loaded condition by a support element melting under the separation temperature. When the support element melts, the spring element is released and separates the connection through its spring force. Thus, in these examples the disconnect device performs the disconnection by a disconnector movement. It stores energy in the form of the compressed or elongated spring element convertible into disconnector movement. The disconnect device releases the stored energy and perform the disconnector movement using the stored energy when the support element melts because the ambient temperature increases to or past the predetermined value that is typical for a fire.

The support element is made for example from a wax material, a plastic material or a metal alloy. In some of these examples, the spring element itself is a component of the electrical connection, thus provided for current conduction in non-triggered condition of the disconnect device. In some other examples, the spring element impacts a switching device for disconnecting the connection, wherein the switching device is actuated by the impact of the spring force of the spring element.

According to another example, in some configurations, the disconnect device includes an expansion element for mechanically disconnecting the electrical connection, wherein the expansion element assumes a sufficiently expanded condition at and above the separation temperature and thus actuates the switching device for separating the connection. In some of these examples, the expansion element is a chemical expansion element, this means the expansion is based on an irreversible chemical reaction which is triggered at the separation temperature. Thus, this chemical expansion element retains its expanded condition when the ambient temperature sinks to any value below the disconnect temperature. In some examples, the expansion element is made e.g. from an intumescence material.

Additionally or alternatively, it is prevented in some examples that the connection is reestablished self-acting in that the disconnect device is configured with a locking device which retains the condition that has been triggered once, for example in case the spring element loses its spring force due to the temperatures in the fire the spring element includes a bi-metal, so that the spring force decreases when the ambient temperature decreases or the expansion element becomes smaller again when the ambient temperature decreases.

In some examples, the disconnect device can be reset manually, this means the electrical connection can be reestablished after the disconnect device is triggered. This is useful for example in cases in which the disconnect temperature was reached during a fire and thus has triggered the disconnect device, however, only fire typical temperatures have occurred which were only marginally higher than the disconnect temperature, so that the pass through line, the branch off device, the branch line or a consumer were not damaged at all. In order to implement this in a simple manner, the disconnect device is implemented in some examples as a separate replaceable component. Thus, in some examples the disconnect device can be connected in the branch off device with plug in contacts or screw clamps, for example directly at the tap device and/or the connection device for connecting the branch line.

Differently from the irreversible function described supra, in some examples the connection is automatically reestablished after the ambient temperature sinks below the disconnect temperature. For example, a blower can be automatically disconnected in case of a fire in order to cut the source of the fire off from fresh air supply, however after the fire is extinguished, the blower can be automatically restarted in order to extract hazardous smoke. Thus in some examples, the disconnect device automatically reestablishes the electrical connection after a thermally induced triggering when the ambient temperature drops to another predetermined value below the separation temperature. This can be implemented for example in that the disconnect device includes a bi-metal spring element or a reversible expansion element for automatically mechanically disconnecting and automatically reestablishing the electrical connection in some of these examples. Since the disconnect devices act in a reversible manner, the respective spring force or expansion force during cooling, possibly with a temperature hysteresis, decreases again and the start condition before triggering, thus the electrical connection, is reestablished.

Subsequently, different aspects with respect to different cable types and the tapping device recited supra are illustrated, wherein these aspects are relevant in particular also with respect to the installation kit that will be described infra.

In typical circular cables, the strands are twisted with one another. In case of a fire, therefore, after the strand insulation is burned off, the strand lines lie on one another at the intersection points. In a flat cable, however, the strand lines run without intersection points in the cable. Therefore, a flat cable has better properties with respect to shorting risk right from the beginning. Furthermore, a flat cable has no inner tensions as they are typical for twisted circular cables, thus it has no pronounced tendency like the round cable to distort when the insulation burns off. Therefore, a flat cable is suitable for circuit integrity under fire impact as a matter of principle.

Accordingly, in some examples, the branch off device is configured for tapping into strands of a through line configured as a flat cable without stripping an insulation, in particular wherein the flat cable includes plural strands extending offset parallel adjacent to one another in one plane.

With respect to the installation kit, tapping without stripping insulation facilitates that the pass through line at the location of the tap, thus in the portion of the branch off device does not have to be disassembled or joined from two separate cables. Thus, the risk is avoided that the pass through line loses its properties with respect to duration of circuit integrity under fire at least partially.

Flat cables are not only widely used as data cables, but are also used for building installations for high voltage lines. High voltage in this disclosure shall designate power with a voltage of at least 100 V (for example 120 V/60 Hz in North America, and 230 V/50 Hz in most other countries; voltage designations respectively refer to one phase relative to ground) for supplying energy to electrical consumers. A high voltage strand is insulated from other high voltage strands of a cable against voltages of this type and typically configured for currents of at least 6 A. However, also hybrid flat cables with high voltage strands and data transmission strands are known (e.g. from EP 0 665 608 A2). Hybrid flat cables of this type are also considered flat cables.

In order to contact the strands, in some examples, the branch off device is configured with at least one contact element per strand to be tapped, wherein the contact element penetrates the through line during installation of the branch off device and contacts the strand. Thus, the contact element can be implemented as a contact screw provided with a tip which is arranged above the respective strand and which initially penetrates the strand insulation with its tip when screwed in and then centrally penetrates the conductor of the strand and thus contacts the conductor. Furthermore, the disconnect device is electrically connected with the contact element.

In order to improve maintaining an electrical contact between the contact screw and the strand conductor under impact of fire, in particular when the support provided by the cable insulation for the strand conductor that is pressed downward by the contact tip is missing when the cable insulation has burned off, in some examples of the branch off device a respective pair of contact screws is provided per strand to be tapped. Thus, the two contact screws of the pair are arranged so that one contact screw contacts one side of the strand conductor and the other contact screw contacts the other side of the strand conductor, so that they clamp the strand conductor between one another. The contact screws are optionally provided with a thread where they contact the strand conductor, wherein the thread laterally cuts into the strand conductor when the contact screw is screwed in in order to provide better contact and support through form locking.

In some examples, both contact screws of a pair are arranged at the same level as the strand conductor passing through, thus on a straight line perpendicular to the strand conductor. In other examples, however, the contact screws of a pair are arranged offset relative to one another in longitudinal cable direction. In the offset arrangement, the two contact screws press the strand conductor laterally in opposite directions so that the strand conductor extends about the contact screws with a slight S-shape. Thus, it envelops the contact screws over part of their circumference which yields a larger contact surface. This increases probability of maintaining the contact under impact of fire, for example when all mechanical tension is lost in the strand conductor or the cable is exposed to jolts through objects falling down.

In some examples, a metal threaded block is used as a socket for the contact screws for each strand, wherein the threaded block is arranged e.g. at a flat side of the cable above the respective strand to be contacted. The metal threaded block is not only used as a socket for the contact screws in a mechanical sense, but is also in electrical contact with the contact screws and thus the strand conductor. Also when all insulations burn off in case of a fire, the metal threaded block keeps the contact screws in their positions where they contact the strand conductor. Thus, the disconnect device is electrically connected with the threaded block or the threaded block is also integrally formed with the disconnect device.

In some examples, the branch off device reaches around the through line. Thus a sliding of the strands from the contact elements can be prevented, in particular when all insulations burn off under the impact of fire.

In order to not put circuit integrity of the through line at risk, in some examples the branch off device is configured with fire resistant insulating components which prevent an electrical short circuit between different strands of the through line, the threaded blocks and/or the disconnect devices under fire impact.

Overall, in some examples, the configuration of the branch off device on the one hand side includes metal components which retain their mechanical and electrical function also under fire impact, and on the other hand side, one or plural spacer elements made from fire resistant insulating material like glass or ceramics, so that even when all insulation of the flat cable burns off or melts off, an electrical short circuit between different strands is excluded.

In some examples, the branch off device, in particular the connection device includes connecting clamps, e.g. configured as screw clamps for connecting strands of the branch line. In some of these examples, at least one connection clamp is integrally formed at the disconnect device.

In order to minimize risks through voltage carrying components in the branch, in some examples a forward conductor and also a backward conductor of the branch line are separated from the through line. Thus, a risk of erroneous swapping of a phase conductor and a neutral conductor during installation can be reduced. In order to mitigate the risk from any swapping of conductors in some examples, all strands of the branch line are separated from the through line.

Thus the disconnect device is configured in some examples for simultaneous disconnecting of at least two conductors (for example for a one-phase branch), four conductors (for example for a three-phase branch) or of all conductors (this means optionally including a protection or ground conductor) of the branch line. In these examples, the disconnect device may have a multipole disconnector. In other examples, the branch off device is configured with one or plural one-pole disconnect devices which is/are configured for separating a single conductor of the electrical connection.

In view of an optional installation in a humid environment, e.g. in tunnels, and loading with fire extinguishing water, in some examples penetration of water into the branch off device is prevented or at least rendered more difficult. In particular, the disconnect devices need to be protected and/or the locations where the contact screws penetrate the insulation of the flat cable. For this purpose, a seal, e.g. made from silicon rubber is provided in some examples. The seal prevents in installed condition of the branch off device that water penetrates into the branch off device and in particular that water can penetrate to locations where the contact screws have perforated the insulation of the flat cable.

Further examples relate to the installation kit for an electrical installation with circuit integrity of an electric through line under fire impact. The installation kit may include at least one through line, at least one branch line, and at least one branch off device. The at least one branch off device comprises a thermally triggering disconnect device for providing circuit integrity of the through line under fire impact. The disconnect device disconnects an electrical connection between the branch line and the through line self-acting when an ambient temperature increases to a predetermined value that is typical for a fire.

In some examples of the installation kit the at least one branch line has a lower circuit integrity duration than the at least one through line.

In some examples the installation kit also includes at least one consumer device, such as a light, to be connected to the at least one branch line. In some examples, the at least one consumer device has a lower circuit integrity duration than the through line.

In some examples the through line comprises a flat cable with plural strands extending parallel adjacent to one another in a plane.

The through line is a continuous line from an electrical point of view, whose length in some examples essentially corresponds to the entire length of the electrical installation (optionally not including the length of branch lines arranged in end portions of the through line).

In some examples, the strands of the through line at least in the portion of the electrical installation extend in one piece essentially over the entire length of the through line. Thus, the through line includes at least one continuous one-piece flat cable that has the same length as the through line. In other examples, however, the through line is assembled from plural sections of flat cables, for example in order to use prefabricated flat cable sections when configuring the electrical installation along the through line. In this case, the particular flat cable sections are electrically connected along the through line with suitable connectors.

In some examples, only simple consumers like continuously operated lights or blowers which are only continuously supplied with electrical power are connected to the through line. Additionally or alternatively, in some examples, also electrical connectors are connected which require a signal and data transmission like e.g. sensors or remotely switchable signal lights.

Thus in some examples, the through line is configured with high voltage strands and/or strands for signal and data transmission for supplying electrical power to consumers. Accordingly, the branch off device is configured in some examples for tapping high voltage strands and/or for tapping strands for signal- and data transmission.

It is possible with the described configuration of the connection device at least for some of the described examples to obtain circuit integrity when using a conventional flat cable that is not configured in particular for circuit integrity. This is due to the previously recited particularly favorable properties of flat cables with respect to the conductors that are not crossing over one another and the lack of internal tensions.

Some examples of the installation kit and the implemented electrical installation use a flat cable which may be configured for circuit integrity. This is a flat cable with plural strands that extend parallel adjacent to one another in a plane, high voltage strands, strands for signal and data transmission or both, wherein fire resistant insulating material is arranged between the strands. An insulating jacket envelops the strands and the fire resistant insulating material. This insulating material prevents that the conductors of the strands can touch, for example under an impact of a mechanical jolt. The strands and the fire resistant insulating material are enveloped by a plastic insulating jacket which forms a position defining bedding for the strands and the fire resistant insulating material when there is no fire. The insulating jacket in turn is enveloped in some examples by a cable jacket made from plastic material, which defines the outer contour of the flat cable and which provides resistance against aggressive substances for the cable and which can be color coated and provided with lettering. In some examples, the insulating jacket also takes over the function of the outer cable jacket.

In some examples the fire resistant insulating material envelops the strands uniformly in all directions, In other examples the fire resistant insulating material extends as a bar between the strands from one strand to another. The bars extend for example parallel to the cable plane and are arranged e.g. in the center plane of the flat cable in which also the strands extend. The fire resistant insulating material thus forms a spacer for the strands, wherein the spacer is configured as a bar which is also maintained when all non-fire resistant insulations are burned off. The fire resistant insulating material thus does not envelop the strands uniformly in all directions, but it extends mainly in the direction in which an adjacent strand is disposed. This is the direction in which there is the main shorting risk for a movement of the strand.

As recited supra, the through line is protected against a short circuit caused by temperatures that are typical for a fire in the branch by means of the branch off device.

Therefore, the installation may be arranged so that the branch off device, in the case of a fire, is essentially exposed to the same ambient temperature as the branch. Fires often occur in a spatially limited area and a temperature distribution in case of a fire can have strong variations over relatively short distances in horizontal direction or also in vertical direction. In some examples, the branch line is sized relatively short, thus e.g. at the most 0.5 m, 1 m, 2 m, 4 m, 7 m, or 10 m.

According to another aspect of this protective function of the branch off device, on the one hand side, for the through line and on the other hand side for the branch, different qualities with respect to circuit integrity under fire impact can be used. In an installation in some examples the circuit integrity of the through line is higher than the circuit integrity of particular branches, since e.g. the through line overall has to remain functional in order to also safely supply branches outside of the area under fire impact. On the other hand side, loss of one or plural branches that are exposed to the fire is tolerable. Thus, the through line for some examples includes a fire safety cable for a particular circuit integrity duration under fire impact while the branch line and/or at least one electrical consumer connected thereto has a lower circuit integrity duration than the fire safety cable itself.

In particular in larger buildings, traffic structures like e.g. tunnels and ships, an evacuation time can be 30 minutes or more. These are therefore typically configured with electrical emergency devices which in case of a fire have to be provided with electrical energy at least for the evacuation time-period in order to facilitate evacuation. Among these are emergency lighting systems, placards, smoke extraction blowers, etc. Accordingly, for some electrical installations, the through line runs along an elongated cavity like e.g. a tunnel or an alley of a building. In some of these examples, the branch lines supply consumers distributed along the cavity.

In some examples, many branch off devices are arranged at the through line that are disposed offset from one another, in particular up to 10, 50, 100, 200 or more branch off devices. Furthermore for some examples, the through line has a length of up to 10 m, 50 m, 100 m, 500 m, 1 km, 5 km, or more. Thus, the through line represents a central electrical supply by which the branch lines are fed through the branch off devices.

For operations and maintenance of the installation, the through line may be assembled from plural sections. Thus, in some configurations, the through line has plural sections, wherein plural branch off devices are connected to these sections. Thus at least one branch off line is respectively connected to these branch off devices, wherein at least one consumer is connected at the branch off line. These sections are respectively secured separately against over current, so that the consumers of one section are jointly secured against over current. Furthermore, the branch off lines are respectively thermally secured one by one through the branch off device with the thermally triggered disconnect device.

Although certain products and methods constructed in accordance with the teachings of the invention have been described herein, the scope of coverage of this patent is not limited thereto. On the contrary, this patent covers all embodiments of the teachings of the invention fairly falling within the scope of the appended claims either literally or under the doctrine of equivalents.

All publications and existing systems mentioned in this specification are herein incorporated by reference.

What is claimed is:

1. An electrical installation with circuit integrity of an electric through line under fire impact, comprising:
   the through line;
   plural consumer devices, wherein the consumer devices have a lower circuit integrity duration under fire impact than the through line;
   plural branch lines;
   and plural branch off devices,
   wherein the consumer devices are connected to the branch lines, the branch lines are connected to the branch off devices, and the branch off devices are connected to the through line;
   wherein at least one of the branch lines has a lower circuit integrity duration under fire impact than the through line, and
   wherein the branch off devices comprise a thermally triggering disconnect device for providing circuit integrity of the through line under fire impact,
   wherein the disconnect device is configured to disconnect an electrical connection between the branch line and the through line self-acting when an ambient temperature increases to a predetermined value that is typical for a fire for securing the through line against a short circuit that occurs in a branch line under the impact of fire by automatically disconnecting the branch line from the through line.

2. The electrical installation according to claim 1, wherein the through line comprises a flat cable with plural strands extending parallel adjacent to one another in a plane.

3. The electrical installation according to claim 1, wherein at least one branch off device is unsecured against over current.

4. The electrical installation according to claim 1, wherein the disconnect device is configured to keep the electrical connection disconnected after a thermally triggered disconnect also when the ambient temperature decreases to any value below the temperature typical for fire which causes the disconnect device to disconnect the electrical connection.

5. The electrical installation according to claim 4,
wherein the disconnect device comprises a spring element for mechanically separating the electrical connection,
wherein the spring element is supported in loaded condition by a support element melting at the temperature typical for fire which causes the disconnect device to disconnect the electrical connection.

6. The electrical installation according to claim 1, wherein the disconnect device, after a thermally triggered disconnect, is configured to reestablish the electrical connection when the ambient temperature decreases to a value below the temperature typical for fire which causes the disconnect device to disconnect the electrical connection.

7. The electrical installation according to claim 1, wherein the through line is a flat cable comprising strands, and at least one branch off device is configured for tapping strands of the flat cable without stripping an insulation of the tapped strands.

8. The electrical installation according to claim 7,
wherein the branch off device reaches around the flat cable and comprised at least one contact element per strand to be tapped,
wherein the contact element is configured to penetrate the flat cable and contact the strand.

9. The electrical installation according to claim 1, wherein at least one branch off device comprises fire resistant insulating components, and is configured to prevent an electrical short between different strands of the through line under fire impact by means of the fire resistant insulating components.

10. The electrical installation according to claim 1, wherein the branch line comprises a forward conductor and a return conductor, and wherein the disconnect device is configured to disconnect the forward conductor and the return conductor.

11. The electrical installation according to claim 1, wherein the predetermined fire typical value is at least about 150° C.

12. The electrical installation according to claim 1, wherein up to 10, 50, 100, 200, 500 or more branch off devices offset from one another are arranged at the through line.

13. The electrical installation according to claim 1,
wherein the through line runs along an elongated cavity, and
wherein the branch lines supply safety relevant consumer devices that are arranged distributed in the cavity.

14. The electrical installation according to claim 1,
wherein the through line includes plural sections,
wherein plural branch off devices are arranged at the plural sections,
wherein branch lines are connected at these plural branch off devices,
wherein at least one consumer device is connected at the branch off device, and
wherein the sections are over current secured separately, so that the consumers devices of a section are jointly secured against over current.

15. An installation kit for an electrical installation with circuit integrity of an electric through line under fire impact, comprising:
at least one through line;
at least one branch line, wherein the at least one branch line has a lower circuit integrity duration under fire impact than the at least one through line; and
at least one branch off device;
wherein the at least one branch off device comprises a thermally triggering disconnect device for providing circuit integrity of the through line under fire impact,
wherein the disconnect device is configured to disconnect an electrical connection between the branch line and the through line self-acting when an ambient temperature increases to a predetermined value that is typical for a fire for securing the through line against a short circuit that occurs in a branch line under the impact of fire by automatically disconnecting the branch line from the through line.

16. The installation kit according to claim 15, further comprising at least one consumer device to be connected to the at least one branch line, wherein the at least one consumer device has a lower circuit integrity duration than the through line.

* * * * *